(12) United States Patent
Hashida (10) Patent No.: US 8,778,057 B2
(45) Date of Patent: Jul. 15, 2014

(54) GAS-ADSORPTION DEVICE STRUCTURE AND METHOD FOR USING SAME

(75) Inventor: Masamichi Hashida, Shiga (JP)

(73) Assignee: Panasonic Corporation, Osaka (JP)

( * ) Notice: Subject to any disclaimer, the term of this patent is extended or adjusted under 35 U.S.C. 154(b) by 58 days.

(21) Appl. No.: 13/636,068

(22) PCT Filed: Mar. 9, 2011

(86) PCT No.: PCT/JP2011/001369

§ 371 (c)(1),
(2), (4) Date: Sep. 19, 2012

(87) PCT Pub. No.: WO2011/118142

PCT Pub. Date: Sep. 29, 2011

(65) Prior Publication Data

US 2013/0008309 A1 Jan. 10, 2013

(30) Foreign Application Priority Data

Mar. 26, 2010 (JP) ................................. 2010-072038

(51) Int. Cl.
*B01D 53/22* (2006.01)

(52) U.S. Cl.
USPC .............. 96/9; 96/149; 96/154; 95/90; 95/95; 95/101; 95/102; 55/359

(58) Field of Classification Search
USPC ......... 95/90, 95, 101, 102; 55/359; 96/9, 149, 96/154

See application file for complete search history.

(56) References Cited

U.S. PATENT DOCUMENTS

| 4,502,876 A * | 3/1985 | Behnke et al. .................. 96/147 |
| 4,726,974 A * | 2/1988 | Nowobilski et al. ............ 428/69 |
| 7,988,770 B2 * | 8/2011 | Hashida et al. ..................... 96/9 |
| 2009/0090242 A1 | 4/2009 | Hashida et al. |

FOREIGN PATENT DOCUMENTS

| CN | 2857909 Y | 1/2007 |
| JP | 59-137777 | 8/1984 |
| JP | 5-254588 | 10/1993 |
| JP | 2006-153150 | 6/2006 |
| JP | 2008-055365 | 3/2008 |
| JP | 2008-200616 | 9/2008 |
| JP | 2008-200617 | 9/2008 |
| WO | 2004/058313 | 7/2004 |

* cited by examiner

*Primary Examiner* — Christopher P Jones
(74) *Attorney, Agent, or Firm* — Hamre, Schumann, Mueller & Larson, P.C.

(57) ABSTRACT

Includes gas adsorption device (1) in which gas adsorbent (3) is decompression-sealed by first package (4) with poor gas permeability, and second package (2) with poor gas permeability. Second package (2) is at least partially flexible. Air that is a gas that gas adsorbent (3) can adsorb is filled between gas adsorption device (1) and second package (2). In this configuration, gas adsorbent (3) adsorbs air when first package (4) is damaged, and thus a pressure inside second package (2) reduces. Due to this pressure reduction, the shape or dimension of second package (2) changes. Any damage to first package (4), i.e., any degradation in adsorption capacity of gas adsorption device (1), can thus be determined by confirming this change.

8 Claims, 5 Drawing Sheets

GAS-ADSORPTION DEVICE STRUCTURE AND METHOD FOR USING SAME

TECHNICAL FIELD

The present invention relates to a gas adsorption device structure including a gas adsorbent, and its method of use.

BACKGROUND ART

Vacuum insulators, vacuum insulation containers, plasma display panels, and so on can demonstrate their performance when their inside is in the high-vacuum state. These types of equipment are called vacuum equipment. If gas exists inside vacuum equipment, pressure inside the vacuum equipment increases, and the performance of the vacuum equipment degrades. Causes of the presence of gas inside the vacuum equipment include gas remaining in the vacuum equipment at manufacturing, and entrance of gas from outside to inside the vacuum equipment over time. To reduce gas inside the vacuum equipment, gas adsorbent is used. The gas adsorbent adsorbs and reduces the gas inside the vacuum equipment. For example, a vacuum insulator can retain the high-vacuum state for a long period by providing the gas adsorbent inside it.

Gas that the gas adsorbent can adsorb (i.e., adsorption target) differs by materials of gas adsorbents. In addition, an amount of gas that the gas adsorbent can adsorb (i.e., adsorbable amount) differs. An adsorption target of the gas adsorbent used for the vacuum insulator is air (i.e., nitrogen and oxygen). Naturally, if this gas adsorbent is left in the air, it absorbs air. In other words, if this gas adsorbent is left in the air, an amount of air that can be adsorbed reduces. This leads to degradation of the adsorption capacity of the gas adsorbent.

PTL 1 discloses a structure that air is not adsorbed even if the gas adsorbent is left in the air. In PTL1, the gas adsorbent (getter) is sealed between two sheets. These two sheets configure a container of the gas adsorbent. Accordingly, this structure prevents the gas adsorbent from adsorbing air even if it is left in the air. The gas adsorbent is disposed in the vacuum equipment together with this container.

The above gas adsorbent is stored inside the container. Therefore, inside of the container must be kept in the vacuum state, or filled with gas that this gas adsorbent does not adsorb.

If the container is in the vacuum state inside, a pressure difference between atmospheric pressure and vacuum is applied to the container. Therefore, if any hole exists in the container, air enters inside the container. If this gas adsorbent is a gas adsorbent used for the vacuum insulator, an adsorption target is air. In this case, the gas adsorbent adsorbs air entering through the hole in the container.

If air entering inside the container is less than the adsorption capacity of the gas adsorbent, the gas adsorbent adsorbs all amount of air that has entered. Accordingly, the vacuum state inside the container can be retained. In this case, the state inside the container does not change regardless of the presence of hole. In other words, although adsorption capacity of the gas adsorbent has reduced due to adsorption of air, it cannot be noticed.

On the other hand, if the container is filled with gas that this gas adsorbent does not adsorb, and a hole exists in the container, the gas enters inside the vacuum insulator. Accordingly, the high-vacuum state cannot be retained inside the vacuum insulator.

CITATION LIST

Patent Literature

PTL1 Japanese Patent Unexamined Publication No. H5-254588

SUMMARY OF THE INVENTION

The present invention offers a gas adsorption device structure that enables determination of any reduction in adsorption capacity of a gas adsorption device. The gas adsorption device structure of the present invention includes a gas adsorption device in which gas adsorbent is decompression-sealed by a first package with poor gas permeability, and a second package with poor gas permeability for sealing the gas adsorption device. At least a part of the second package is flexible. In addition, gas that the gas adsorbent can adsorb is enclosed between the gas adsorption device and the second package in the gas adsorption device structure of the present invention.

With this structure, the gas adsorbent adsorbs gas if the first package is damaged, and pressure inside the second package reduces. This reduction in pressure changes the shape or dimension of the second package. By confirming the presence of this change, any breakage of the first package, i.e., reduction in the adsorption capacity of the gas adsorption device, can be determined.

DESCRIPTION OF EMBODIMENTS (First Exemplary Embodiment)

Figure 1A:
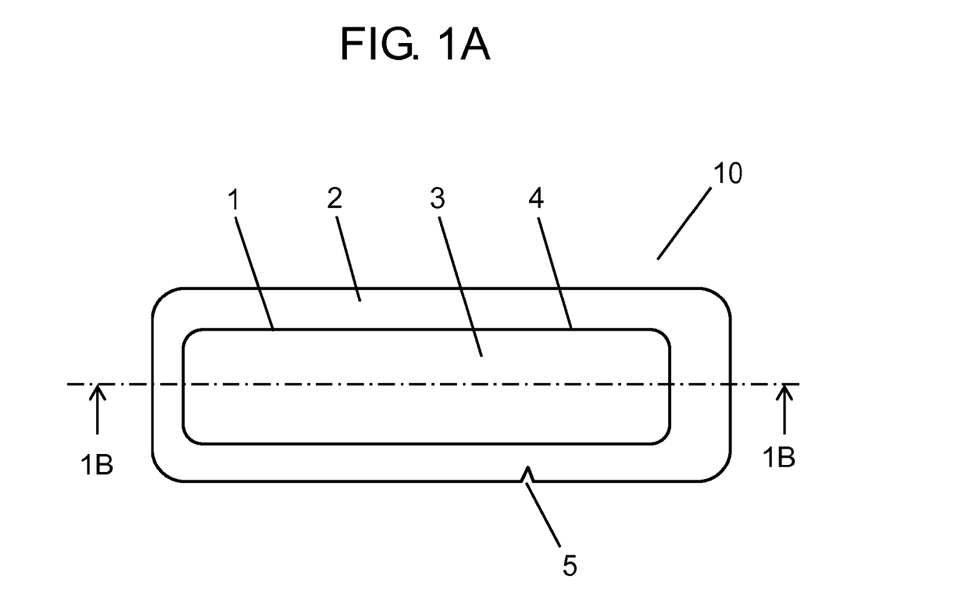
FIG. 1A is a plan view of a gas adsorption device structure in accordance with a first exemplary embodiment of the present invention.
Figure 1B:
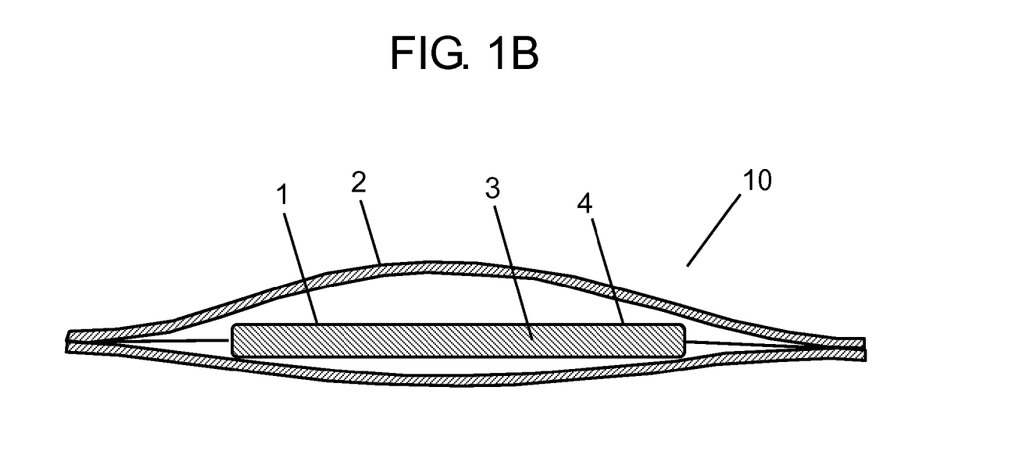
FIG. 1B is a sectional view taken along line 1B-1B in FIG. 1A.

FIG. 1A is a plan view of a gas adsorption device structure in the first exemplary embodiment of the present invention. FIG. 1B is a sectional view taken along line 1B-1B in FIG. 1A.

Gas adsorbent 3 is vacuum-sealed by container 4, which is a first package with poor gas permeability. As gas adsorbent 3, for example, CuZSM-5 is used. As container 4, for example, an aluminum container is used. This is how gas adsorption device 1 is configured. In the description, 'vacuum' refers to a practical vacuum state. For example, it is the decompressed state of about 10 Pa. In this exemplary embodiment, gas adsorption device 1 is assumed to be used for a vacuum insulator. In other words, an adsorption target of gas adsorbent 3 is air.

Gas adsorption device 1 is sealed together with air, which is gas that gas adsorbent 3 can adsorb, in outer package 2, which is the second package. Outer package 2 has flexibility and poor gas permeability. Outer package 2 is shaped like a bag, for example, by overlaying two pieces of sheet made by laminating a low-density polyethylene film and biaxially-stretched nylon film, and sealing the periphery by welding. This is how gas adsorption device structure 10 is configured.

Outer package 2 has notch 5. Notch 5 is formed on a welded part of two sheets configuring outer package 2. Gas adsorption device 1 is taken out from gas adsorption device structure 10 for use. To take out gas adsorption device 1, outer package 2 is torn to open. Notch 2 makes it easy to tear outer package 2. If there is no notch 5 on outer package 2, a large force is needed to tear outer package 2. If a large force is applied to tear outer package 2, an unintended event may occur due to excessive force. To avoid such event, a tool such as scissors will be needed. Accordingly, notch 5 on outer package 2 enables safe and easy handling of gas adsorption device structure 10.

Since air exists between gas adsorption device 1 and outer package 2, there is a portion that gas adsorption device 1 and outer package 2 do not make contact. In addition, this air acts as a cushioning material, and absorbs impact from outside outer package 2. In other words, breakage of gas adsorption device 1 is suppressed. This air is filled to an extent that breakage of gas adsorption device 1 due to impact applied from outside outer package 2 can be suppressed.

Next is described a case when container 4, which is the first package, of gas adsorption device 1 is broken. Since gas adsorbent 3 is vacuum-sealed in container 4, it does not normally make contact with air. However, although it is extremely rare, a hole may exist in container 4 from the very beginning of manufacture because gas adsorption device 1 is an industrial product. In addition, a hole may be created in container 4 afterward, or container 4 may break afterward. If gas adsorption device 1 is left in the air in a state that container 4 is damaged, gas adsorbent 3 adsorbs air. This state is called leak. If leak occurs, the adsorption capacity of gas adsorbent 3 reduces, and thus performance of gas adsorption device 1 degrades. If a hole in container 4 cannot be visually confirmed, whether or not the performance of gas adsorption device 1 is degraded cannot be determined.

Figure 2A:
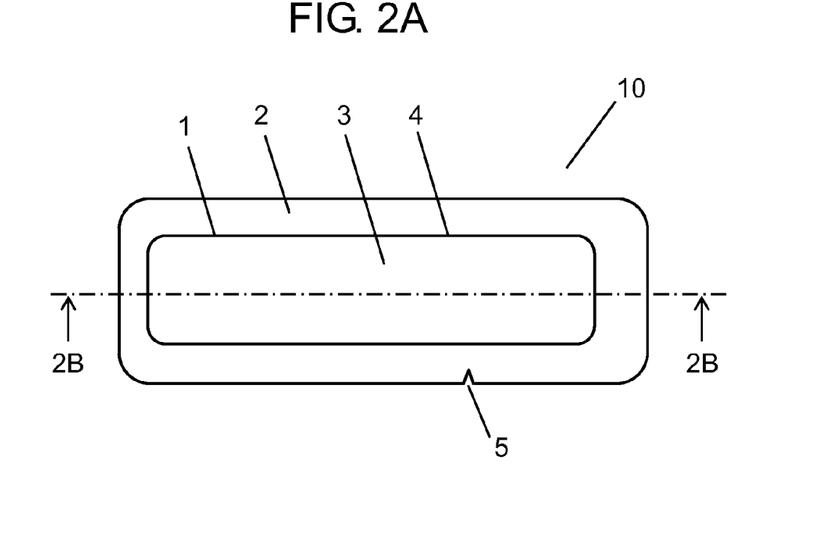
FIG. 2A is a plan view when a first package of a gas adsorption device is broken in the exemplary embodiment.
Figure 2B:
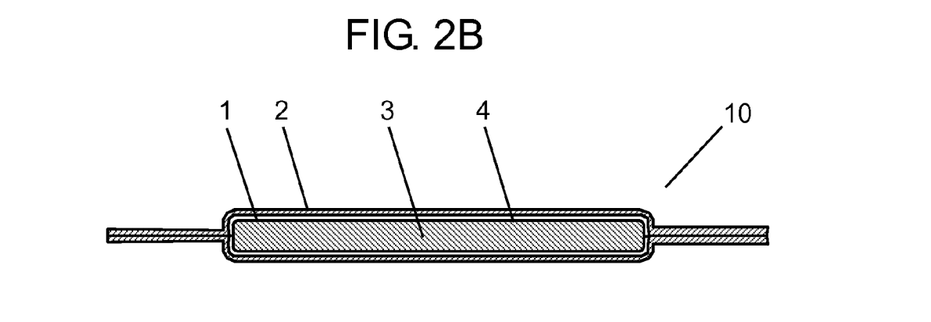
FIG. 2B is a sectional view taken along line 2B-2B in FIG. 2A.

FIG. 2A is a plan view when the first package of the gas adsorption device in this exemplary embodiment is damaged, i.e., when leak occurs. FIG. 2B is a sectional view taken along line 2B-2B.

If leak occurs, the space between gas adsorption device 1 and outer package 2 communicates with gas adsorbent 3. Gas adsorbent 3 adsorbs air that exists in the space between gas adsorption device 1 and outer package 2. This reduces the pressure of the space between gas adsorption device 1 and outer package 2. Since outer package 2 is flexible, at least its shape or dimension changes due to pressure reduction. FIG. 2B is the state that thickness of bag-shaped outer package 2 has reduced by pressure reduction. Compared to the state that there is no breakage in container 4, as shown in FIG. 1B, gas adsorption device 1 and outer package 2 are adhered in a broader area, as shown in FIG. 2B, when container 4 is damaged. Less the air remains in the space between gas adsorption device 1 and outer package 2, greater the degree of this adhesion. In other words, a greater degree of adhesion means greater degradation in performance of gas adsorption device 1.

In this exemplary embodiment, outer package 2 is configured with flexible sheets, and thus entire bag-shaped outer package 2 deforms. On the other hand, if only a part of outer package 2 is flexible, occurrence of leak can be noticed by confirming the deformation state of this part.

If outer package 2 has a transparent portion at least at a position that gas adsorption device 1 can be visually recognizable, the state, type, etc. of gas adsorption device 1 can be confirmed. FIGS. 1A and 2A show the case that outer package 2 is entirely transparent. If type, use, specifications, validity, etc. of gas adsorbent 3 are indicated on container 4 of gas adsorption device 1, common outer package 2 can be used. This reduces manufacturing costs.

Next, gas adsorbent 3 is detailed. Gas adsorbent 3 adsorbs non-condensable gas. Either physical adsorption or chemical adsorption is applicable as adsorption mechanism. For example, oxides of alkali metal, oxides of alkali earth metal, hydroxides of alkali metal, and hydroxides of alkali earth metal are used. More specifically, lithium oxide, lithium hydroxide, barium oxide, and barium hydroxide are used. In particular, CuZSM-5 has extremely good air adsorbability, and thus it is preferable if air is the adsorption target.

Next, container 4, which is the first package, is detailed. Container 4 vacuum-seals gas adsorbent 3 to prevent it from making contact with air. For this purpose, container 4 is configured with a material that poorly permeates gases. A material of container 4 has gas permeability of $10^4$ [$cm^3/m^2 \cdot day \cdot atm$] or less. More preferably, a material of container 4 has gas permeability of $10^3$ [$cm^3/m^2 \cdot day \cdot atm$] or less. As a material of container 4, for example, glass, metal, or a laminate film laminated with metal is used.

Next, outer package 2, which is the second package, is detailed. Outer package 2 seals gas adsorption device 1 and gas that gas adsorbent 3 can adsorb. At least the shape or dimension of outer package 2 changes, depending on a change in internal pressure. Therefore, outer package 2 is at least partially flexible, and is configured with a material that poorly permeates gases.

With respect to flexibility, outer package 2 is made of a material thin enough to reflect the shape of gas adsorption device 1 when it closely attaches to gas adsorption device 1. In addition, outer package 2 is made of a material with mechanical characteristics that it will not cause irreversible damage, i.e., breakage or cracking, when external force is applied to outer package 2. If only a part of outer package is flexible, a stress generated by pressure reduction concentrates on this flexible part. Accordingly, a change in at least either shape or dimension becomes sensitive to internal pressure reduction. In other words, a faint leak can be noticed.

With respect to gas permeability, a material of outer package 2 has gas permeability of $10^4$ [$cm^3/m^2 \cdot day \cdot atm$] or less. More preferably, the material of outer package 2 has gas permeability of $10^3$ [$cm^3/m^2 \cdot day \cdot atm$] or less.

To satisfy these conditions, outer package 2 is, for example, configured with a plastic film made by thinly processing high-molecular substance. Since the plastic film demonstrates flexibility to heat and pressure, it can be processed or molded to an intended shape. More specifically, for example, a polyethylene film, polyethylene terephthalate film, nylon film, polypropylene film, polycarbonate film, polystyrene film, ethylene-vinyl alcohol copolymer film, and polyvinyl alcohol film are used.

Next, an adhesion level of gas adsorption device 1 and outer package 2 are detailed. The adhesion level of gas adsorption device 1 and outer package 2 is a proportion of surface area of gas adsorption device 1 attached to outer package 2. For example, the adhesion level can be measured as follows.

First, the surface of gas adsorption device 1 is projected onto a plane. A projected area is divided by millimeters. For example, if gas adsorption device 1 is a rectangular parallelepiped of 15 mm×80 mm×3 mm, a projected area is a rectangle of 15 mm×80 mm. Accordingly, the projected area is divided into 1200 pieces, which is obtained by 15 multiplied by 80. Next, the surface of outer package 2 is divided into squares of 1 mm×1 mm. Then, the number of above square areas included in an area of outer package 2 reflecting the surface shape of gas adsorption device 1, i.e., an area where outer package 2 and gas adsorption device 1 attach, is counted. In this measurement, even a slightly attached area is also counted in the above square areas. As a result of measurement, if the number is 600 squares, for example, 50%, which is obtained by 600 divided by 1200, is the adhesion level.

As described above, the presence of leak can be determined by checking deformation of outer package 2 or the adhesion level. Gas adsorption device 1 without any leak retains its initial performance (i.e., initial adsorbable capacity). If leak occurs, a degree of degradation in performance of gas adsorption device 1 can be determined by checking deformation of outer package 2 or the adhesion level.

In general, gas adsorption device 1 without leak is selected before use. More specifically, those without change in at least the shape or dimension of outer package 2, i.e., outer package 2 with predetermined shape, is selected. Selected gas adsorption device structure 10 is opened, and gas adsorption device 1 is taken out for use. This prevents defective gas adsorption device 1 from being used in vacuum equipment.

(Second Exemplary Embodiment)

Figure 3:
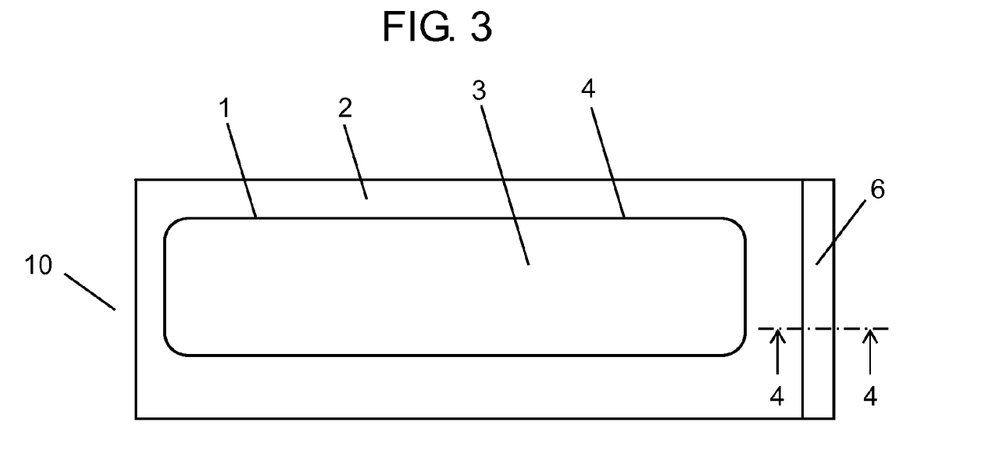
FIG. 3 is a plan view of a gas adsorption device structure in a second exemplary embodiment of the present invention.
Figure 4A:
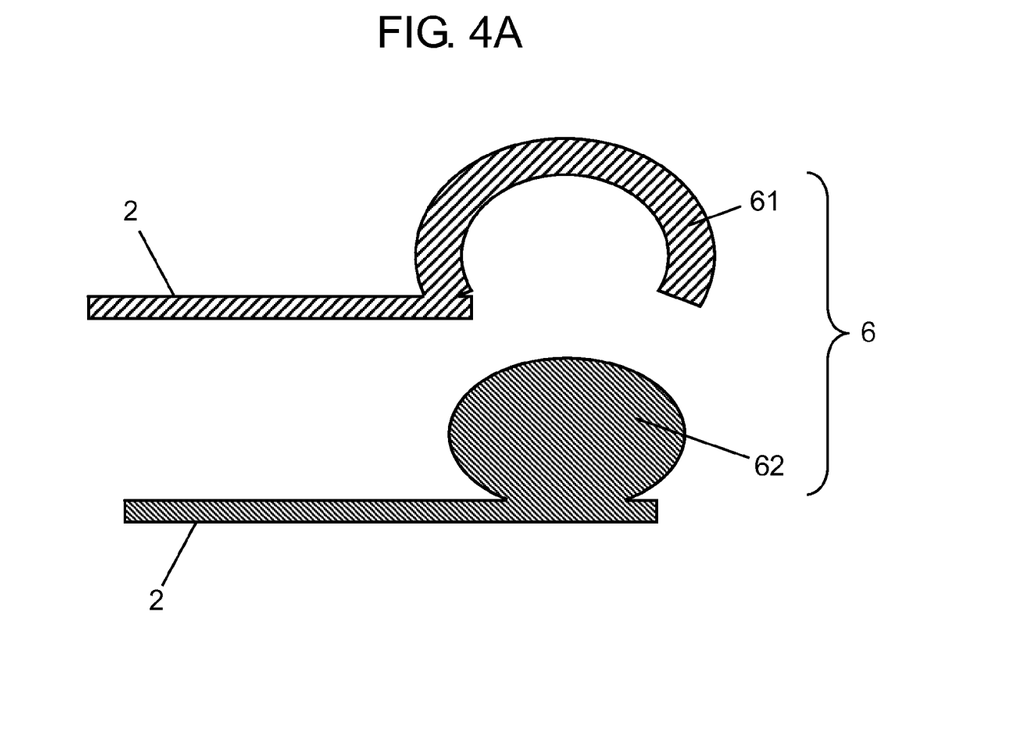
FIG. 4A is a sectional view taken along line 4-4 in FIG. 3.
Figure 4B:
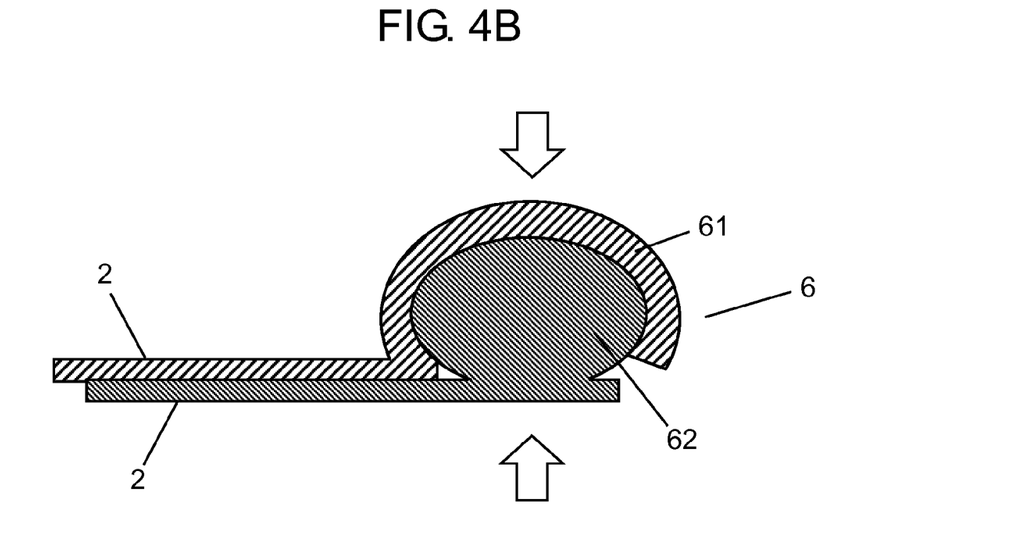
FIG. 4B is a sectional view in another state taken along line 4-4 in FIG. 3.

FIG. 3 is a plan view of a gas adsorption device structure in the second exemplary embodiment of the present invention. FIG. 4A is a sectional view taken along line 4-4 in FIG. 3. FIG. 4B is a sectional view in another state taken along line 4-4 in FIG. 3. Components same as the first exemplary embodiment are given the same marks in the description.

Gas adsorption device structure 10 in this exemplary embodiment has opening-and-closing structure 6. More specifically, outer package 2 is made of a low-density polyethylene film, and its three sides around rectangle are welded. Opening-and-closing structure 6 is formed on remaining one side. As shown in FIG. 4A, opening-and-closing structure 6 are configured with concave portion 61 formed at an end of one outer package 2 and convex portion 62 formed at an end of the other outer package 2. Concave portion 61 and convex portion 62 are linearly formed in the plan view. In addition, convex portion 61 and concave portion 62 are formed at positions facing each other.

As shown in FIG. 4B, concave portion 61 and convex portion 62 are airtightly fitted by being pushed from the direction of arrow. Accordingly, air is sealed inside outer package 2. Since opening-and-closing structure 6 has this kind of mechanical structure, fitting can be released by applying a force in a direction opposite to the arrow in FIG. 4B. Gas adsorption device structure 10 can thus be opened to easily take out gas adsorption device 1. Furthermore, opening-and-closing structure 6 can be repeatedly opened and closed. Accordingly, outer package 2 can be reused.

(Third Exemplary Embodiment)

Figure 5A:
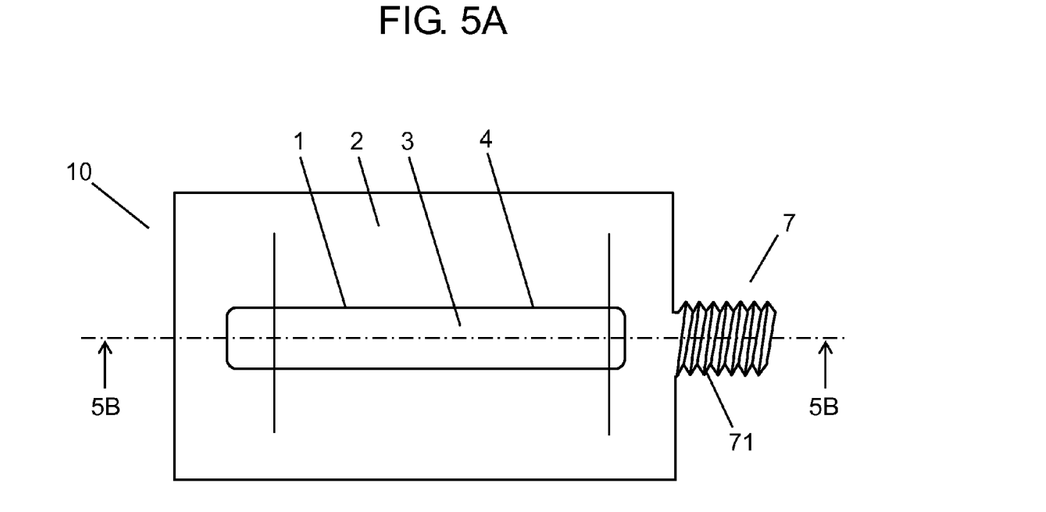
FIG. 5A is a plan view of a gas adsorption device structure in accordance with a third exemplary embodiment of the present invention.
Figure 5B:
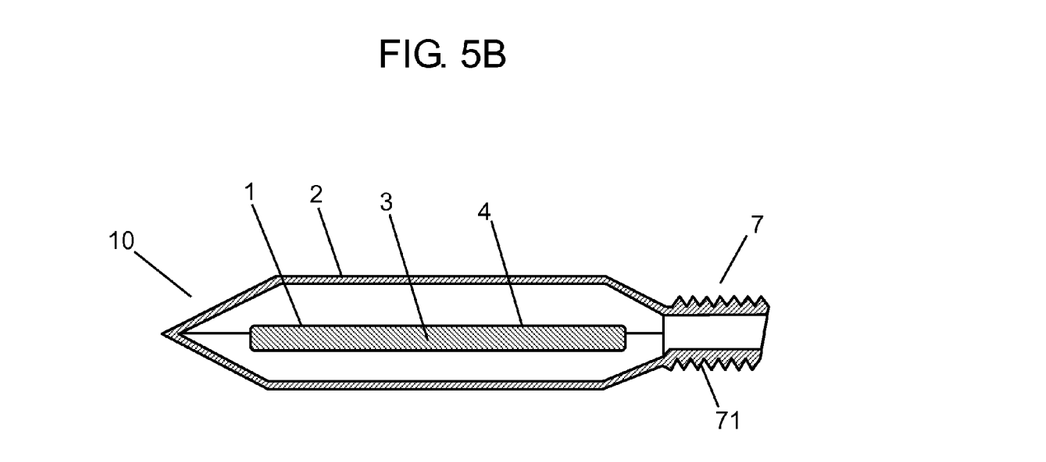
FIG. 5B is a sectional view taken along line 5B-5B in FIG. 5A.
Figure 6A:
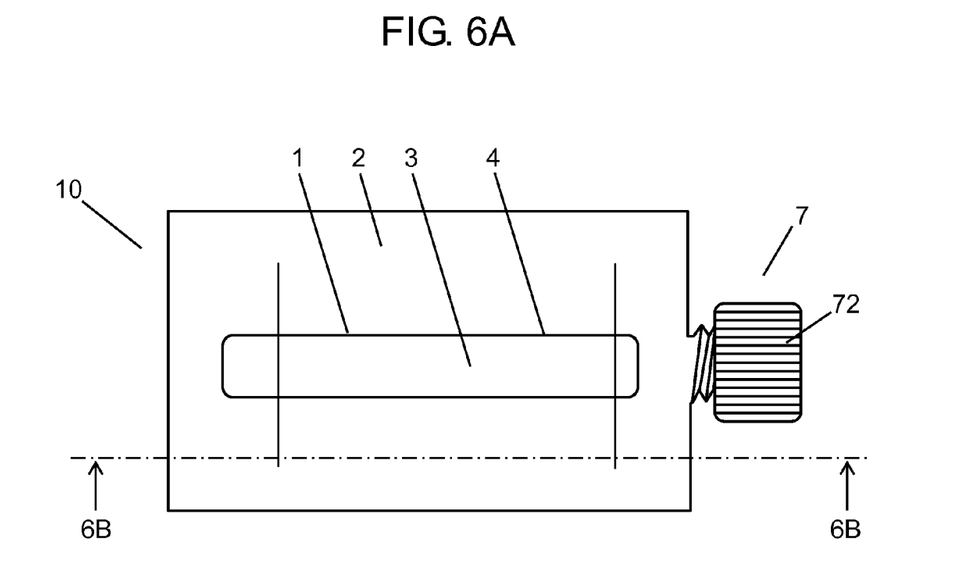
FIG. 6A is a plan view in another state of the gas adsorption device structure in accordance with the third exemplary embodiment of the present invention.
Figure 6B:
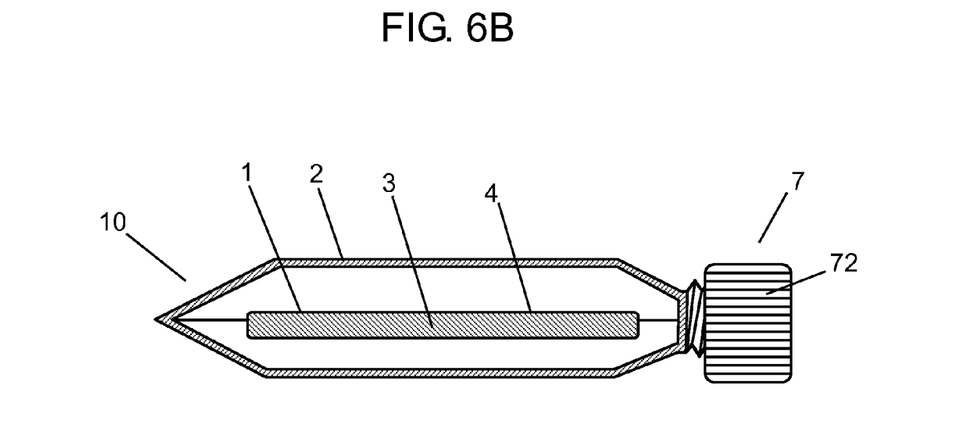
FIG. 6B is a sectional view taken along line B-B in FIG. 6A.

FIG. 5A is a plan view of a gas adsorption device structure in the third exemplary embodiment of the present invention. FIG. 5B is a sectional view taken along line 5B-5B in FIG. 5A. FIG. 6A is a plan view of the gas adsorption device structure in another state in the third exemplary embodiment of the present invention. FIG. 6B is a sectional view taken along line 6B-6B. Components same as the first exemplary embodiment are given the same marks in the description.

A point that differs from the second exemplary embodiment in this exemplary embodiment is that opening-and-closing structure 7 using a screw is provided as a mechanical opening-and-closing structure. As shown in FIGS. 5A and 5B, gas adsorption device structure 10 has opening-and-closing structure 7 using a screw at an end. Outer package 2 is made of a low-density polyethylene film, same as the second exemplary embodiment, and three sides around rectangle are welded. Cap 72 is screwed to male screw 1 formed on remaining one side, as shown in FIGS. 6A and 6B. A female screw (not illustrated) corresponding to male screw 71 is formed inside cap 72. By screwing male screw 71 and the female screw of cap 72, airtightness needs to be retained. Therefore, the screw of opening-and-closing structure 7 is typically sealed.

Since a screw is used as opening-and-closing structure 7, it is easy to open gas adsorption device structure 10 and take out gas adsorption device 1. The size of gas adsorption device 1 is smaller than inner diameter of male screw 71. Furthermore, opening-and-closing structure 7 can be repeatedly opened and closed. Accordingly, outer package 2 can be reused.

As described above, mechanical structures of opening-and-closing structure 6 and opening-and-closing structure 7 are not irreversible fixed structures, such as bonding in a molecular level. They have a structure that multiple components are fixed by external stress. Other mechanical opening-and-closing structure 6 or opening-and-closing structure 7 includes wedge, hinge, rubber band, and spring.

Next is described examples 1 to 6 for application of the present invention to storage and leak of gas adsorption device 1 (i.e., hole in container 4), material of outer package 2, and vacuum insulator of gas adsorption device 1.

EXAMPLE 1

In Example 1, gas adsorption device structure 10 in the first exemplary embodiment is used. Gas adsorption device 1 is prepared by sealing gas adsorbent 3 (2 g) formed of CuZSM-5 in container 4 configured with 0.2-mm thick aluminum. Outer package 2 is made by laminating a 50-μm thick low-density polyethylene film and a 25-μm thick biaxially-stretched nylon film. Outer package 2 is shaped like a bag using the low-density polyethylene film as a thermal welding layer. After placing gas adsorption device 1 in outer package 2, outer package 2 is sealed by thermal welding. This completes gas adsorption device structure 10.

A volume of outer package 2 immediately after sealing gas adsorption device 1 was 5.5 cc. At this point, an adhesion level of gas adsorption device 1 and outer package 2 was 80%.

As specimens, 1,000 pieces of above gas adsorption device structure 10 were prepared. These specimens were dropped from 1-m height to a concrete floor 10 times. Then, these specimens were stored for one month.

As a result, 985 pieces retained the adhesion level of 80%. On the other hand, adhesion level of remaining 15 pieces was 100%.

Based on the above results, it is apparent that there is no leak in 985 pieces of gas adsorption device 1. In other words, no hole was generated in container 4 due to damage. Accordingly, adsorption capacity, i.e., performance of gas adsorption device 1, has been retained. On the other hand, in 15 pieces, the adhesion level was 100%, and thus air inside outer package 2 was adsorbed. In other words, a hole was generated in container 4 by damage, causing leak.

Next, an amount of air adsorption was measured in specimens that have not been dropped, specimens without leak that have been dropped and stored for one month, and specimens with leak that have been dropped and stored for one month. More specifically, AUTOSORB-1-C by Quantachrome was used to measure the amount of air adsorption at 25° C. from adsorption isotherm and 10 Pa.

As a result, the amount of air adsorption in specimens that have not been dropped was 10 cc. The amount of air adsorption in specimens without leak that have been dropped and stored for one month was 10 cc. The amount of air adsorbed in specimens with leak that have been dropped and stored for one month was 4.5 cc.

Based on the above results, it is apparent that an initial amount of air adsorption is retained in specimens without leak. In other words, they retained performance as gas adsorption device structure 10. On the other hand, the amount of adsorbable air has reduced in specimens with leak because air inside outer package 2 has been adsorbed.

EXAMPLE 2

In Example 2, gas adsorption device structure 10 same as Example 1 is prepared. A volume of outer package 2 immediately after sealing gas adsorption device 1 was 8.5 cc. At this point, the adhesion level of gas adsorption device 1 and outer package 2 was 50%.

As specimens, 1000 pieces of above gas adsorption device structure 10 were prepared. They were dropped and stored under the same conditions as Example 1. As a result, 995 pieces retained the adhesion level of 50%. On the other hand, the adhesion level of remaining 5 pieces was 100%.

Based on the above results, no leak occurred in 995 pieces of gas adsorption device 1. In other words, adsorption capacity of gas adsorption device 1 has been retained. On the other hand, leak occurred in 5 pieces.

Next, same as Example 1, an amount of air adsorption was measured in specimens that have not been dropped, specimens without leak that have been dropped and stored for one month, and specimens with leak that have been dropped and stored for one month. The measuring method and measuring conditions were the same as Example 1.

As a result, the amount of air adsorption in specimens that have not been dropped was 10 cc. The amount of air adsorption in specimens without leak that have been dropped and stored for one month was 10 C. The amount of air adsorption of specimens with leak that have been dropped and stored for one month was 1.5 cc.

Based on the above results, it is apparent that an initial amount of air adsorption is retained in specimens without leak. In other words, they retained performance as gas adsorption device structure 10. On the other hand, the amount of adsorbable air has reduced in specimens with leak because air inside outer package 2 has been adsorbed.

EXAMPLE 3

In Example 3, gas adsorption device structure 10 same as Example 1 is prepared. A volume of outer package 2 immediately after sealing gas adsorption device was 15.5 cc. At this point, the adhesion level of gas adsorption device 1 and outer package 2 was 10%.

As specimens, 1000 pieces of above gas adsorption device structure 10 were prepared, and they were dropped and stored under the same conditions as Example 1. As a result, all 1000 pieces retained the adhesion level of 10%. An amount of air adsorption was measured in these specimens and specimens that have not been dropped, same as Example 1. The measuring method and measuring conditions were the same as Example 1.

Based on the above results, the amount of air adsorption in all specimens was 10 cc. In other words, no leak occurred, and they retained performance as gas adsorption device structure 10. Accordingly, it is apparent that gas adsorption device structure 10 has good impact resistance when the adhesion level of gas adsorption device 1 and outer package 2 is 10%.

EXAMPLE 4)

In Example 4, gas adsorption device structures 10 same as Example 1 with and without notch 5 on outer package 2 are prepared. To take out gas adsorption device 1, a tensile stress is applied to outer package 2 to open outer package 2.

For those without notch 5, a tensile stress was applied to a sealed part of outer package 2. As a result, a tensile stress of 120 newtons was needed to open outer package 2. On the other hand, for those with notch 5, a tensile stress was applied alternately on both sides of notch 5. As a result, a tensile stress of 10 newtons was needed. Based on the above results, it is apparent that notch 5 facilitates opening of outer package 2. Accordingly, man-hour can be reduced at installing gas adsorption device 1 in vacuum equipment.

EXAMPLE 5

Example 5 uses gas adsorption device structure 10 in the second exemplary embodiment. Gas adsorption device 1 is prepared by sealing gas adsorbent 3 (2 g) made of CuZSM-5 in container 4 configured with 0.2-mm thick aluminum. Outer package 2 is formed of 200-μm thick low-density polyethylene. Outer package 2 has mechanical opening-and-closing structure 6.

A volume of outer package 2 immediately after sealing gas adsorption device 1 was 7.5 cc. At this point the adhesion level of adsorption device 1 and outer package 2 was 70%.

As specimens, 1000 pieces of above gas adsorption device 1 were prepared. They were dropped and stored under the same conditions as Example 1. As a result, 985 pieces retained the adhesion level of 70%. On the other hand, the adhesion level of remaining 15 pieces was 85%. The volume of outer package 2 of these 15 specimens became 3 cc.

Based on the above results, no leak occurred in 935 pieces of gas adsorption device 1. In other words, gas adsorption device 1 retained the adsorption capacity. On the other hand, leak occurred in 15 pieces.

Next, same as Example 1, an amount of air adsorption was measured in specimens that have not been dropped, specimens without leak that have been dropped and stored for one month, and specimens with leak that have been dropped and stored. The measuring method and measuring conditions were the same as Example 1. Gas adsorption device 1 can be taken out by releasing the fitting of opening-and-closing structure 6.

As a result, the amount of air adsorption in specimens that have not been dropped was 10 cc. The amount of air adsorption in specimens without leak that have been dropped and stored for one month was 10 cc. The amount of air adsorption in specimens with leak that have been dropped and stored for one month was 0 cc.

Here, the volume of outer package 2 of the specimens with leak has changed from 7.5 cc to 3 cc. In other words, 4.5 cc of air has reduced. On the other hand, the amount of air adsorption was 10 cc when there was no leak, and 0 cc when there was leak. In other words, the amount of air adsorption was 10 cc. An amount of reduced air, i.e., 4.5 cc, does not correspond to the amount of adsorbed air, i.e., 10 cc. This is because air has entered through opening-and-closing structure 6 of outer package 2.

Based on the above results, reduction in the amount of air adsorption of gas adsorption device 1 cannot be determined based on reduction in the volume of outer package 2. However, it is apparent that occurrence of leak can be determined. In addition, since outer package 2 can be reused, cost of gas adsorption device structure 10 can be reduced. Occurrence of leak can still be correctly determined after 100 times of opening and closing of opening-and-closing structure 6.

EXAMPLE 6

Example 6 uses gas adsorption device structure 10 in the third exemplary embodiment. Gas adsorption device 1 is prepared by sealing gas adsorbent 3 (2 g) formed of CuZSM in container 4 configured with 0.2-mm thick aluminum. Outer package 2 is made by laminating a 50-μm thick low-density polyethylene film and a 25-μm thick nylon film. The low-density polyethylene film is sealed at four sides as a thermal welding layer in outer package 2. It has mechanical opening-and-closing structure 7. Opening-and-closing structure 7 is configured with male screw 71 and cap 72 having female screw. Male screw 71 is hollow inside for taking in and out gas adsorption device 1.

A volume of outer package 2 immediately after sealing gas adsorption device 1 was 5.5 cc. At this point, the adhesion level of gas adsorption device 1 and outer package 2 was 80%.

As specimens, 1000 pieces of above gas adsorption device structures 10 were prepared, and they were dropped and stored under the same conditions as Example 1. As a result, 985 pieces retained the adhesion level of 80%. On the other hand, the adhesion level of remaining 15 pieces was 85%. The volume of outer package 2 of these 15 pieces was 3 cc.

Based on the above results, no leak from gas adsorption device 1 occurred in 985 pieces. In other words, they retained the adsorption capacity as gas adsorption device 1. On the other hand, leak occurred in 15 pieces.

Next, same as Example 1, an amount of air adsorption was measured in specimens that have not been dropped, specimens without leak that have been dropped and stored for one month, and specimens with leak that have been dropped and stored for one month. The measuring method and measuring conditions were the same as Example 1. Gas adsorption device 1 can be taken out by removing cap 72 of opening-and-closing structure 7.

As a result, the amount of air adsorption of specimens that have not been dropped was 10 cc. The amount of gas adsorption of specimens without leak that have been dropped and retained for one month was 10 cc. The amount of gas adsorption of specimens with leak that have been dropped and stored for one month was 0 cc.

A volume of outer package 2 of specimens with leak has changed from 5.5 cc to 3 cc. In other words, air has reduced for 2.5 cc. On the other hand, the amount of air adsorption when there was no leak was 10 cc, and 0 cc when there was leak. In other words, the amount of gas adsorption was 10 cc. The amount of air that has been reduced, i.e., 2.5 cc, does not correspond to the amount of adsorbed air, i.e., 10 cc. This is because air has entered from outside through opening-and-closing structure 7 of outer package.

Based on the above results, reduction in the amount of air adsorption of gas adsorption device 1 cannot be determined based on reduction in the volume of outer package 2. However, it is apparent that occurrence of leak can be determined. In addition, since outer package 2 can be reused, cost of gas adsorption device structure 10 can be reduced. Occurrence of leak can still be correctly determined after 100 times of opening and closing of opening-and-closing structure 7.

Next is described a case without outer package 2, and a case that the adhesion level of outer package 2 and gas adsorption device 1 does not change with an amount of air inside outer package 2, with reference to Comparisons 1 and 2.

(Comparison 1)

In Comparison 1, gas adsorption device 1 of Example 1 is stored for one month without placing it in outer package 2 as a conventional storage method. The amount of air adsorption of gas adsorption device 1 before and after storage is measured. The measuring method and measuring conditions are the same as Example 1.

As a result, the amount of gas adsorption before storage was 10 cc. On the other hand, the amount of gas adsorption after storage was 9.7 cc. Accordingly, leak occurred for 0.3 cc. However, occurrence of this leak cannot be determined.

(Comparison 2)

In Comparison 2, gas adsorption device 1 of Example 1 is placed in a 0.5-mm thick iron container without placing it in outer package 2, and stored for one month. After storage, the iron container is opened, and gas adsorption device 1 is disposed in a vacuum insulator after 10 minutes. A volume of the iron container was 25 cc both before and after storage. As a reference, gas adsorption device 1 immediately after it was prepared was also disposed in a vacuum insulator.

The amount of air adsorption in these pieces was measured using the measuring method and measuring conditions same as Example 1. As a result, the amount of gas adsorption in gas adsorption device 1 immediately after it was prepared was 5 cc. On the other hand, the amount of air adsorption of gas adsorption device 1 after storing it in the iron container for one month was 3.5 cc.

Based on the above results, the volume of iron container has not changed even though the adsorption amount of gas adsorption device 1 has reduced for 1.5 cc. It is apparent that reduction in the amount of air adsorption in gas adsorption device 1 cannot be determined if gas adsorption device 1 is stored in 0.5-mm thick iron container. This is because the 0.5-mm thick iron container does not easily deform under atmospheric pressure. Accordingly, outer package 2 needs to be formed of a flexible material.

Industrial Applicability

As described above, the present invention can determine any performance degradation of a gas adsorption device by a change in the shape of the outer package. Accordingly, the present invention is suitable for quality inspection and storage of gas adsorption devices.

REFERENCE MARKS IN THE DRAWINGS

| | |
|---|---|
| 1 | Gas adsorption device |
| 2 | Outer package (second package) |
| 3 | Gas adsorbent |
| 4 | Container (first package) |
| 5 | Notch |
| 6, 7 | Opening-and-closing structure |
| 10 | Gas adsorption device structure |

The invention claimed is:

1. A gas adsorption device structure comprising:
   a gas adsorption device in which a gas adsorbent is decompression-sealed by a first package with poor gas permeability; and
   a second package with poor gas permeability for sealing the gas adsorption device, the second package being at least partially flexible;
   wherein
   a gas that the gas adsorbent can adsorb is filled between the gas adsorption device and the second package.

2. The gas adsorption device structure of claim 1, wherein a pressure of the gas reduces by the gas adsorbent adsorbing the gas when an inner side communicates with an outer side of the first package due to damage to the first package, and at least one of a shape and a dimension of the second package changes.

3. The gas adsorption device structure of claim 1, wherein the second package has a transparent part at least in a position where the gas adsorption device can be visually recognized.

4. The gas adsorption device structure of claim 1, wherein the gas absorbs an impact from outside the second package.

5. The gas adsorption device structure of claim 1, wherein the second package is at least partially notched.

6. The gas adsorption device structure of claim 1, wherein the second package has an opening-and-closing structure.

7. The gas adsorption device structure of claim 1, wherein the gas adsorbent is CuZSM-5.

8. A method of using the gas adsorption device structure of claim 1, the method comprising step of:
   selecting the gas adsorption device structure with the second package of a predetermined shape;
   opening the second package of the gas adsorption device structure; and
   taking out the gas adsorption device from the gas adsorption device structure,
   wherein
   the gas adsorption device is used.

* * * * *